United States Patent
Ko et al.

(10) Patent No.: US 9,374,440 B2
(45) Date of Patent: Jun. 21, 2016

(54) PACKET FORWARDING STRUCTURE AND METHOD FOR SUPPORTING NETWORK BASED CONTENT CACHING OF AGGREGATE CONTENTS

(75) Inventors: Nam Seok Ko, Daejeon (KR); Sung Kee Noh, Daejeon (KR); Jong Dae Park, Daejeon (KR)

(73) Assignee: Electronics and Telecommunications Research Institute, Daejeon (KR)

(*) Notice: Subject to any disclaimer, the term of this patent is extended or adjusted under 35 U.S.C. 154(b) by 366 days.

(21) Appl. No.: 13/619,711

(22) Filed: Sep. 14, 2012

(65) Prior Publication Data

US 2013/0163610 A1 Jun. 27, 2013

(30) Foreign Application Priority Data

Dec. 27, 2011 (KR) .................... 10-2011-0143144

(51) Int. Cl.
*H04L 12/26* (2006.01)
*H04L 29/08* (2006.01)
*H04L 12/743* (2013.01)

(52) U.S. Cl.
CPC .......... *H04L 67/327* (2013.01); *H04L 45/7457* (2013.01); *H04L 67/1097* (2013.01); *H04L 67/2842* (2013.01)

(58) Field of Classification Search
CPC . H04L 67/1097; H04L 67/327; H04L 67/284; H04L 45/02; H04L 41/12; H04L 45/00; H04L 45/04; H04L 43/12; H04L 29/0653; H04L 29/06095; H04L 49/3009; H04L 49/309; H04L 45/74; H04L 49/252; H04L 12/24; H04L 2012/54
See application file for complete search history.

(56) References Cited

U.S. PATENT DOCUMENTS

| | | | | |
|---|---|---|---|---|
| 7,404,201 B2* | 7/2008 | Takeuchi | ............ | G06F 17/3089 348/E7.073 |
| 8,103,781 B1* | 1/2012 | Wu | ................... | H04L 29/12028 709/223 |
| 8,204,060 B2 | 6/2012 | Jacobson et al. | | |
| 8,621,154 B1* | 12/2013 | Goldschmidt | ...... | G06F 17/3033 707/827 |
| 2003/0086425 A1* | 5/2003 | Bearden | ............. | H04L 12/2697 370/392 |
| 2005/0201376 A1* | 9/2005 | Iizuka | ................ | G01C 21/3679 370/392 |
| 2009/0169021 A1* | 7/2009 | Ushiyama | ........... | H04L 63/0428 380/279 |
| 2010/0202452 A1* | 8/2010 | Ram | ....................... | H04L 12/18 370/390 |
| 2011/0099288 A1* | 4/2011 | Sedlak | ............... | H04N 7/17336 709/233 |
| 2011/0307628 A1* | 12/2011 | Chiba | ................... | H04L 49/355 709/241 |
| 2012/0239775 A1* | 9/2012 | Hubbard | ............. | H04L 63/0227 709/217 |
| 2012/0239811 A1* | 9/2012 | Kohli et al. | ................... | 709/226 |
| 2012/0254155 A1* | 10/2012 | Heim et al. | ................... | 707/721 |
| 2013/0058353 A1* | 3/2013 | Koponen | ............ | H04L 12/4633 370/401 |

* cited by examiner

*Primary Examiner* — Candal Elpenord
(74) *Attorney, Agent, or Firm* — Nelson Mullins Riley & Scarborough LLP; Anthony A. Laurentano (57) ABSTRACT

Provided is a packet forwarding structure for supporting network based content caching of aggregate contents. The packet forwarding structure includes: a forwarding table including forwarding information on a content in order to forward a request packet from a terminal; a request list table transmitting the request packet to a destination node according to the forwarding table when the request packet arrives; a content caching information table including the forwarding table, the request list table, and position information on where a content cashed based on a content ID or a content name is stored; and a content server function block storing the cached content.

18 Claims, 6 Drawing Sheets

(Prior Art)

Fig. 3

(Prior Art)

| Name | Content Location |
|---|---|
| /etri.re.kr/nsko/doc/ | location: ge-1/1/0<br>control fields: caching required(1), .... |

PACKET FORWARDING STRUCTURE AND METHOD FOR SUPPORTING NETWORK BASED CONTENT CACHING OF AGGREGATE CONTENTS

CROSS-REFERENCE TO RELATED APPLICATIONS

This U.S. non-provisional patent application claims priority under 35 U.S.C. §119 of Korean Patent Application No. 10-2011-0143144, filed on Dec. 27, 2011, the entire contents of which are hereby incorporated by reference.

BACKGROUND OF THE INVENTION

The present invention disclosed herein relates to a packet forwarding structure and method for supporting content caching of aggregate contents in a network device.

Various studies on searching for new alternatives to an IP based internet structure have been in progress in one big frame called the future internet. As its representative example, suggested is a Content-Centric Network (CCN) technique that a data transfer structure based on an internet protocol address is transmitted by using the name of a content and each network node caches the content.

Figure 1:
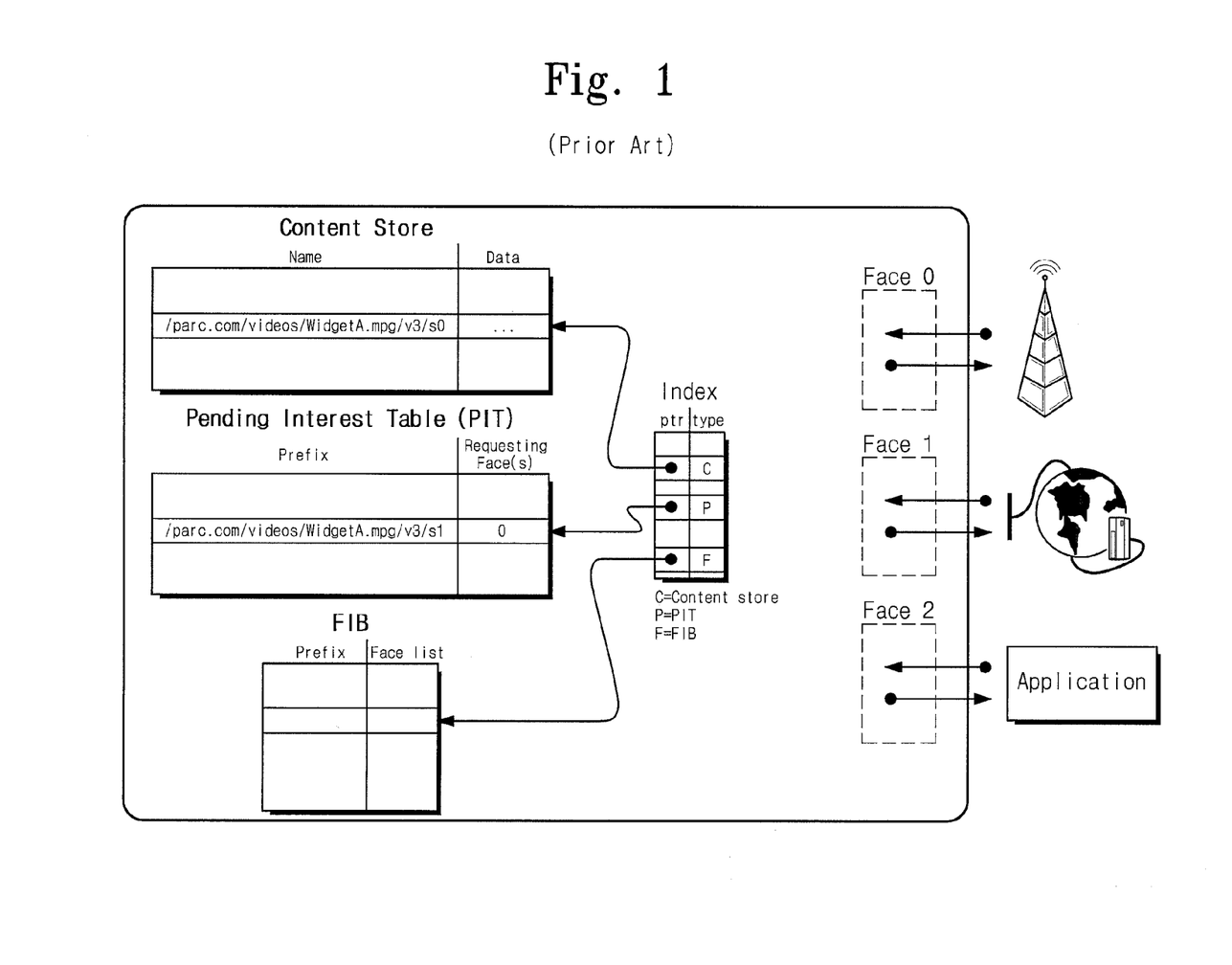
FIG. 1 is a view illustrating a typical CCN.

FIG. 1 is a view illustrating a typical CCN. Referring to FIG. 1, the CCN includes a content store (CS), a Pending Interest List (PIT), and a Forwarding Information Base (FIB), as a forwarding engine.

The content delivery in the CCN structure of FIG. 1 includes an interest packet and a data packet for delivering a content in response to the interest packet.

Figure 2:
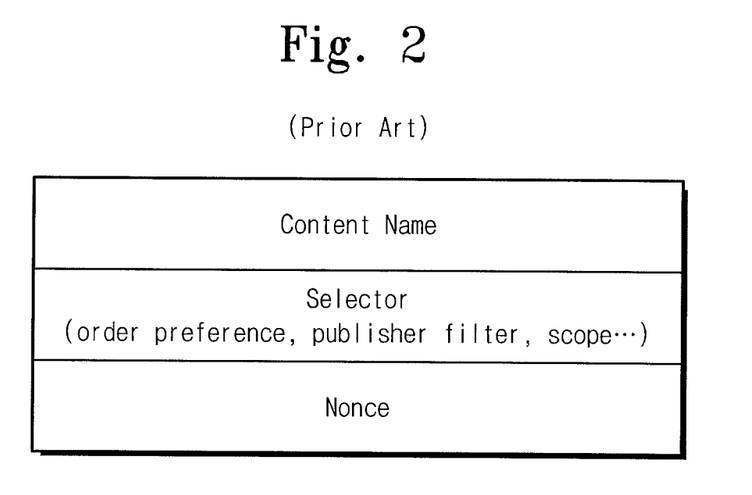
FIG. 2 is a view illustrating a request packet for content in the CCN structure of FIG. 1.
Figure 3:
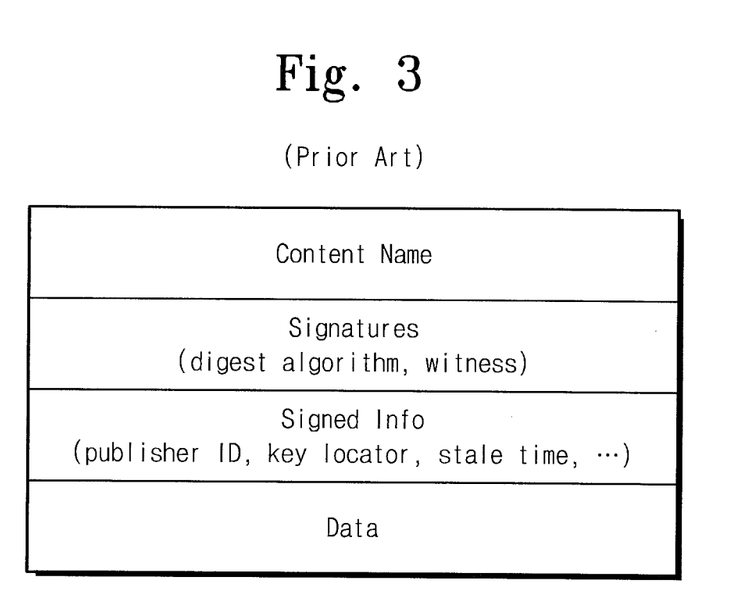
FIG. 3 is a view illustrating a data packet in the CCN structure of FIG. 1.

FIG. 2 is a view illustrating a request packet for content in the CCN structure of FIG. 1. FIG. 3 is a view illustrating a data packet in the CCN structure of FIG. 1.

The CS may store data content like a buffer memory of a router and may replace the data content for efficient distribution through a Least Recently Used (LRU) or Least Frequently Used (LFU) method.

The FIB is used for forwarding a request packet from a terminal (i.e., a content consumer) by using forwarding information on contents registered in the core of the CCN.

The PIT is used as path information. Once a request packet arrives at the CS, it is transmitted according to the FIB. Then, the request packet manages information on a requested input and an output face in order to arrive at a final destination node. The requested content is delivered from the final destination node to a content requesting node that provides the request packet by using the PIT as path information.

The PIT needs to retransmit the request packet if the requested content does not arrive within a predetermined time, and deletes the list of the corresponding request packet if the requested content does not arrive for a predetermined time after the retransmission.

Once a request packet and a data packet arrive at a node, the longest match lookup is performed in order of the CS, the PIT, and the FIB. After the request packet arrives, if there is a content that matches the name of the content of the inputted request packet in the CS, the matching content is transmitted according to a face that the request packet inputs, and then, the request packet is deleted. If there is no matching content in the CS, the PIT is searched.

After the name of the request packet is searched from the PIT, if it is a new content request, the input face of the request packet is added to the PIT list. Additionally, the request packet is forwarded after the FIB is searched using the name of the request packet, and corresponding output profile information is added to the PIT. If the name of the request packet is not searched from the FIB, the request packet is deleted.

Once a data packet arrives at a node, the PIT is searched first in order to transmit data on a corresponding content to a face (at least one face), where the request packet arrives, and the CS simultaneously. That is, the content is stored in the CS. If there is no matching content in the PIT, it means that the data have never been requested, and thus, the data are deleted. In this case, depending on an option, the data may be transmitted to the CS to be stored therein or just may be deleted.

Since such a CCN structure is designed to transmit each content of a small unit during content delivery, a request and a response for each content may cause inefficiency.

A packet forwarding structure based on a typical CCN includes a request and a response to each content, thereby causing inefficiency in content delivery. For example, let's assume that a user wants a video file "/etri.re.kr/nsko/doc/". Additionally, let's assume that the video file has two versions v0 and v1 after modification, each having five segments s0 to s4. In the typical CCN, in order to request and receive the version v0 of "/etri.re.kr/nsko/media/aaa/mov" with a version and segment numbers assigned, a content request for each of the segments (from the first segment to the final segment "/etri.re.kr/nsko/media/aaa/mov/v0/s0" to "/etri.re.kr/nsko/media/aaa/mov/v0/s4") needs to be made with the segment number increased. The present invention provides more efficient content delivery by processing a content request of entire segments or a range unit of a segment.

SUMMARY OF THE INVENTION

The present invention provides a packet forwarding structure and method for supporting content caching of aggregate contents on the basis of a Content Caching Information Base (CCIB) and a Content Server Function Block (CSFB), i.e., a storage device of a content unit.

Embodiments of the present invention provide a packet forwarding structure for supporting network based content caching of aggregate contents, the packet forwarding structure including: a forwarding table including forwarding information on a content in order to forward a request packet from a terminal; a request list table transmitting the request packet to a destination node according to the forwarding table when the request packet arrives; a content caching information table including the forwarding table, the request list table, and position information on where a content cashed based on a content ID or a content name is stored; and a content server function block storing the cached content.

In some embodiments, the request list table may manage information on a requested input and output faces, and may be used as path information through which the requested content is transmitted from the destination node to a content requesting node that generates the request packet after the request packet arrives at the destination node having the content.

In other embodiments, the request list table may retransmit the request packet when the content does not arrive at the destination node within a predetermined time.

In still other embodiments, the request list table may delete a list corresponding to the request packet when the content does not arrive for a predetermined time after the request packet is retransmitted.

In even other embodiments, the content caching table may include the content ID or the content name as a search key value, and may include a content caching in progress field notifying that content caching on a content corresponding to the search key value is in progress.

In yet other embodiments, the content server function block may be provided as another line card in the same system.

In further embodiments, the content server function block may be connected to an external through a face corresponding to the content caching information table.

In other embodiments of the present invention, a packet forwarding method for supporting network based content caching of aggregate contents includes: searching for an entry corresponding to a requested packet in a content caching information table; storing the packet in a content server function block when the entry is in the content caching information table; and performing a caching function on a content corresponding to the packet in the content server function block, wherein the content caching information table includes position information on the cached content.

In some embodiments, the method may further include, when the entry is not in the content caching information table and the packet is a request packet, searching a request list table by setting a content ID or a content name as a search key.

In other embodiments, the method may further include, when there is a list corresponding to the search key in the request list table, deleting the request packet.

In still other embodiments, the method may further include, when there is no list corresponding to the search key in the request list table, generating a list corresponding to the request packet, adding input face information, and searching a forwarding table to forward the request packet.

In even other embodiments, the method may further include, when no content name corresponding to the request packet is searched in the forwarding table, deleting the request packet.

In yet other embodiments, the method may further include retransmitting the request packet by the request list table when a content corresponding to the request packet does not arrive for a predetermined time.

In further embodiments, the method may further include deleting an entry for the request packet by the request list table when the content does not arrive for a predetermined time after the retransmission.

In further embodiments, the method may further include, when there is no entry and the packet is a content transmission packet, generating an entry for the packet in the content caching information table.

In further embodiments, the method may further include setting a content caching in progress field in the generated entry when the content transmission packet is a data packet having a sub content name.

In further embodiments, the method may further include initializing the content caching in progress field when the sub content arrives.

In further embodiments, the method may further include transmitting the content transmission packet to the content server function block.

In further embodiments, the method may further include: searching for the corresponding entry from the request list table after the content transmission packet is transmitted to the content server function block; and transmitting the data packet to a face where the request packet arrives, the face being registered in the searched entry.

In further embodiments, the method may further include deleting the request packet when there is no corresponding searched entry in the request list table.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

The present invention provides a forwarding structure and device for supporting network based content caching of aggregate contents.

Figure 4:
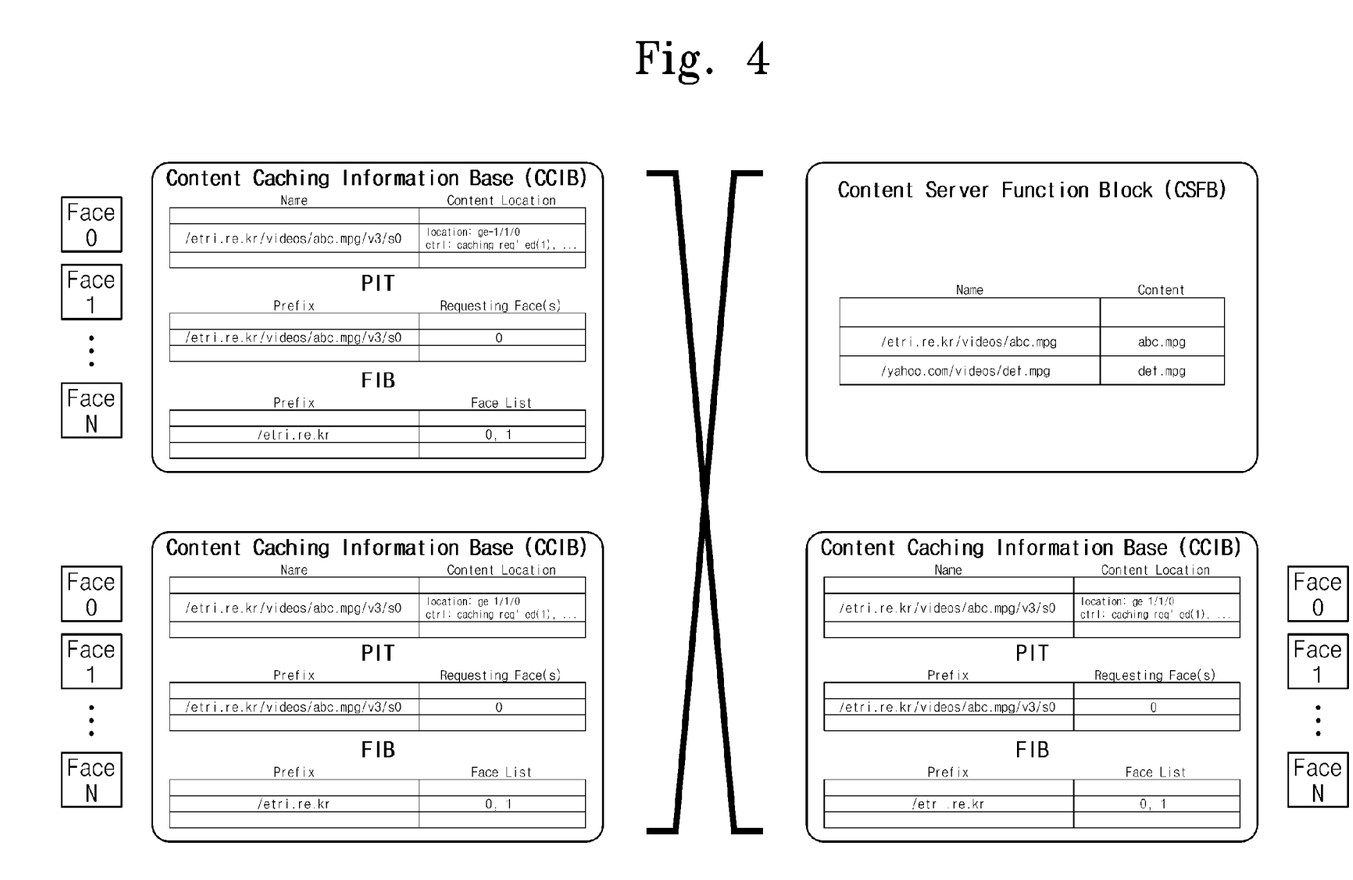
FIG. 4 is a view illustrating a forwarding engine structure for supporting network based content caching according to a first embodiment of the present invention.

FIG. 4 is a view illustrating a forwarding engine structure for supporting network based content caching according to a first embodiment of the present invention. Referring to FIG. 4, the forwarding engine structure includes a Content Caching Information Base (CCIB) and a Content Server Function Block (CSFB).

The CCIB includes a forwarding information base (FIB), a pending interest list (PIT), and information on the actually stored positions of contents on the basis of a content ID or a content name.

The FIB is used as forwarding information for content in order to forward a request packet from a terminal (i.e., a content consumer).

The PIT is used as path information. Once a request packet arrives at the CS, it is transmitted according to the FIB. Then, the request packet manages information on a requested input and an output face in order to arrive at a final destination node. The requested content is delivered from the final destination node to a content requesting node that provides the request packet by using the PIT as path information.

The PIT needs to retransmit the request packet if the content does not arrive within a predetermined time, and deletes the list of the corresponding request packet if the content does not arrive for a predetermined time after the retransmission.

As mentioned above, the CCIB does not retain actual contents but only maintain position information on a corresponding entry in the CSFB, i.e., an actual storage where contents are cached. For example, in the case of a system having a multi blade form including a plurality of line cards, the CSFB including storage such as a hard disk connected through switch fabric may store a slot number, i.e., physical information of a line card being performed.

The CSFB is a storage device of a content unit. The CSFB is in a different line card type in the same system. The CSFB may be a blade having an additional storage device in the case of an external server or a multi blade network device.

Figure 5:
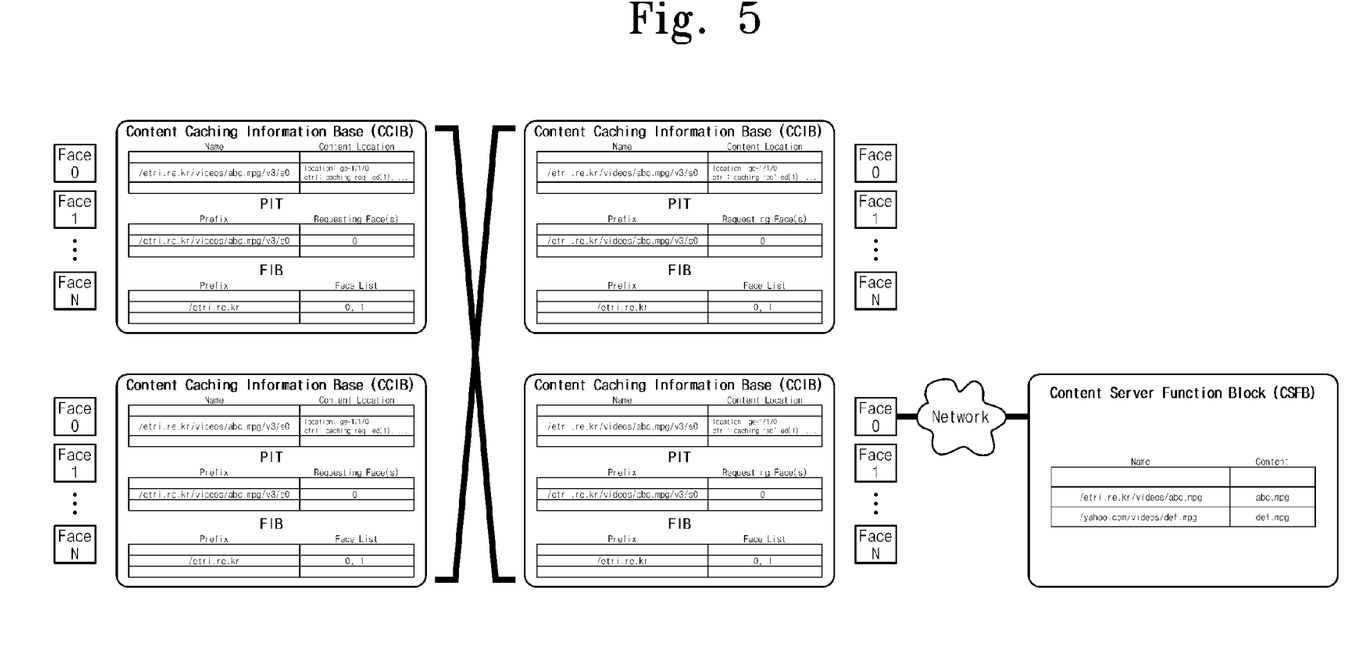
FIG. 5 is a view illustrating a forwarding engine structure for supporting network based content caching according to a second embodiment of the present invention.

FIG. 5 is a view illustrating a forwarding engine structure for supporting network based content caching according to a second embodiment of the present invention. Referring to FIG. 5, the Face 0 of the CCIB is connected to the CSFB via a network. That is, the CSFB is connected an external through the Face 0.

Figure 6:
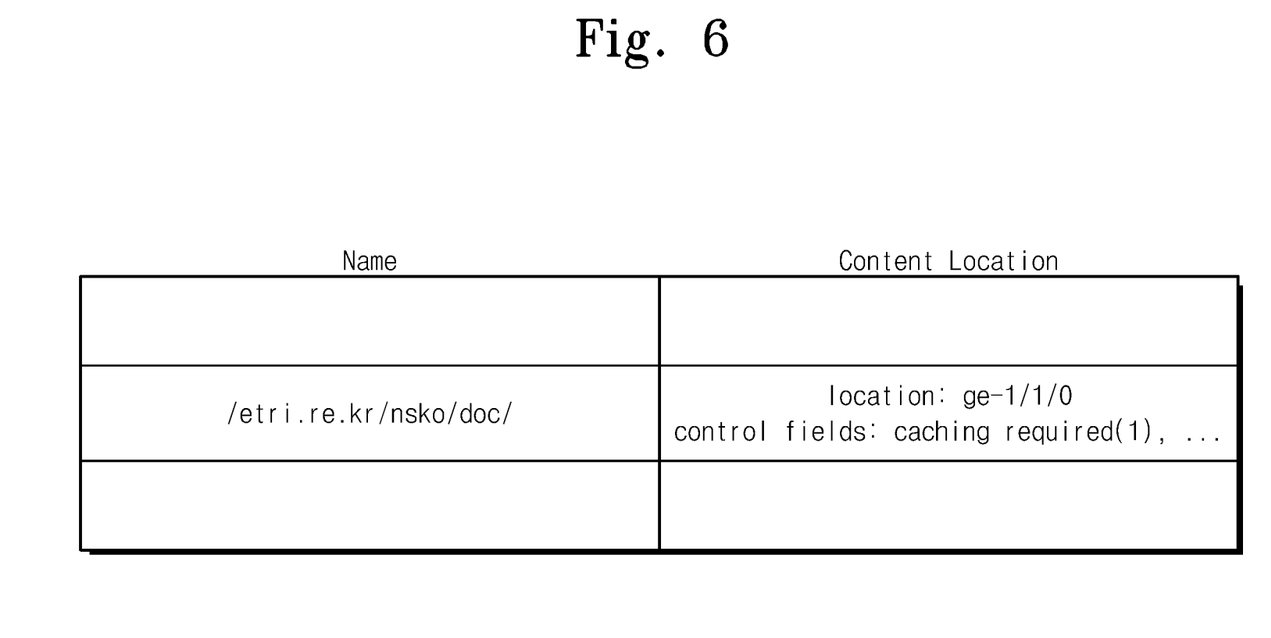
FIG. 6 is a view illustrating a CCIB structure according to an embodiment of the present invention.

FIG. 6 is a view illustrating a CCIB structure according to an embodiment of the present invention. Referring to FIG. 6, the CCIB includes content position information corresponding to a name. A search key value of the CCIB includes a content ID or name. Its information field includes the actual storage position of the content, and a control field includes a content caching in progress field The content caching in progress field represents that content caching for a corresponding content name is in progress.

The content caching in progress field is initialized with 0 in order to represent that content caching is completed after a corresponding content is completely transmitted in case that all sub contents of aggregate contents are not transmitted.

The content transmission completion is the case that the last content of a sub content is displayed on the control field of a data packet. In the case of one data packet including no sub content, a corresponding field is not set.

Additionally, in relation to the CCIB of FIG. 6, in the case of a content transmission packet having a sub-content name, caching for an originally requested top content and cashing for each sub content are performed simultaneously. In this case, caching for a top content name may be implemented in a way that points out caching corresponding sub contents.

When a system starts up, a packet is inputted during standby. Then, the CCIB is searched first on the inputted packet. If there is an entry matching a CCIB search result and also a Content Caching (CC) required field is set for the information, a corresponding packet is copied to the CSFB and then is transmitted. The CSFB receiving the packet performs an actual caching function on the content, and there are various alternative algorithms such as Least Recently Used (LRU) or Least Frequently Used (LFU).

If there is no entry matching a CCIB search result and an input packet is a request packet, by using a content ID or a content name as a search key, the PIT is searched. If an entry for corresponding content occurs already, input Face information is added to a corresponding entry, and the request packet is deleted. Moreover, if there is no entry, after generating an entry, input Face information is added and the FIB is searched in order to forward the request packet and add corresponding output Face information to the PIT. If the content name of the request packet is not searched from the FIB, the request packet is deleted.

The PIT needs to retransmit the request packet if the requested content does not arrive within a predetermined time, and deletes the entry for the corresponding request packet if the requested content does not arrive for a predetermined time after the retransmission.

If there is no entry matching a search result for the CCIB and an input packet is a content transmission packet, an entry for corresponding content is generated in the CCIB. At this point, if a data packet includes a sub content name, a content caching in progress field is set as corresponding entry information of the CCIB.

Additionally, when the last sub content arrives, the content caching in progress field is initialized. Furthermore, after the content transmission packet is copied to the CSFB and then transmitted, data are transmitted to the Face (at least one Face is possible) where the request packet arrives, which is registered in the matching entry, by searching the PIT. At this point, if there is no matching entry in the PIT, since there is no previous content request on the corresponding content, a corresponding packet is deleted.

The content delivery of the present invention includes a request packet and a data packet. For description and understanding, the configuration of a request packet and a content transmission packet is described in a way that adds a necessary field to the same format as the typical CCN structure.

As a field that should be included, the present invention defines a control field representing a content name of a request packet, a content name of a content transmission packet, and the last content transmission packet of a sub content corresponding to a sub content name and a content name.

Figure 7:
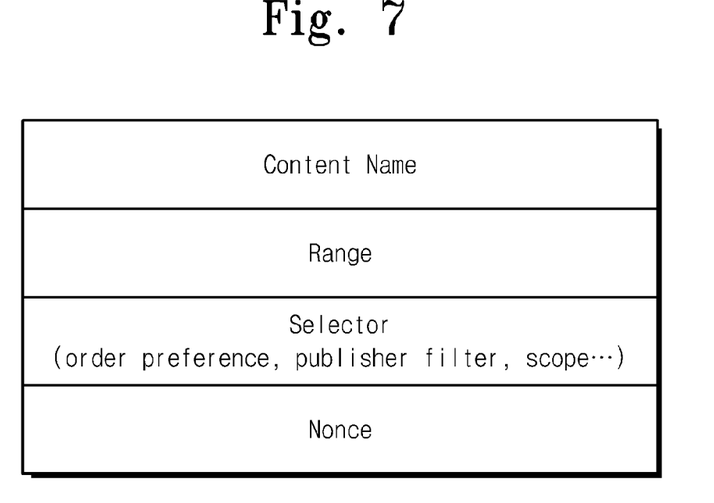
FIG. 7 is a view illustrating a request packet according to an embodiment of the present invention.

FIG. 7 is a view illustrating a request packet according to an embodiment of the present invention. Referring to FIG. 7, the request packet includes a content range for a segment or a file in order to simultaneously request several segments on one content file including a plurality of segments, or request all files below one layer structure.

The content range for the request packet may be a logical concept, and may vary in a CCN format. For example, if there are two versions _v0 and _v1 of a video file "/etri.re.kr/nsko/media/aaa/mov" and each version file includes five segments _s0 to s4, like "/etri.re.kr/nsko/media/aaa/mov/_v0/_s0_s1", a segment range may be designated for the segment 0 to the segment 1, or like "/etri.re.kr/nsko/media/aaa/mov/_v0/", all segments may be designated with the version in the content name but without the segment number. That is, "/etri.re.kr/nsko/media/aaa/mov/_v0/" is used as a content name, and an additional range may be designated with the format such as "0-1" or "StartSegment=0, End Segment=1". In this case, the format such as "0-0" or "StartSegment=0, End Segment=0" may be used to designate one segment or a specific value such as "StartSegment=Inf, EndSegment=Inf" (here, Inf is used to represent infinity) may be used to designate all the segments.

Additionally, as an example of a request packet, when various data files including a html file for a specific screen of a web page is managed in one layer structure, all files for the page 1 may be simultaneously requested, instead of the case that each file below "/etri.re.kr/nsko/html/page1/" is separately requested. In this case, "/etri.re.kr/nsko/html/page1/" is used as a content name.

Figure 8:
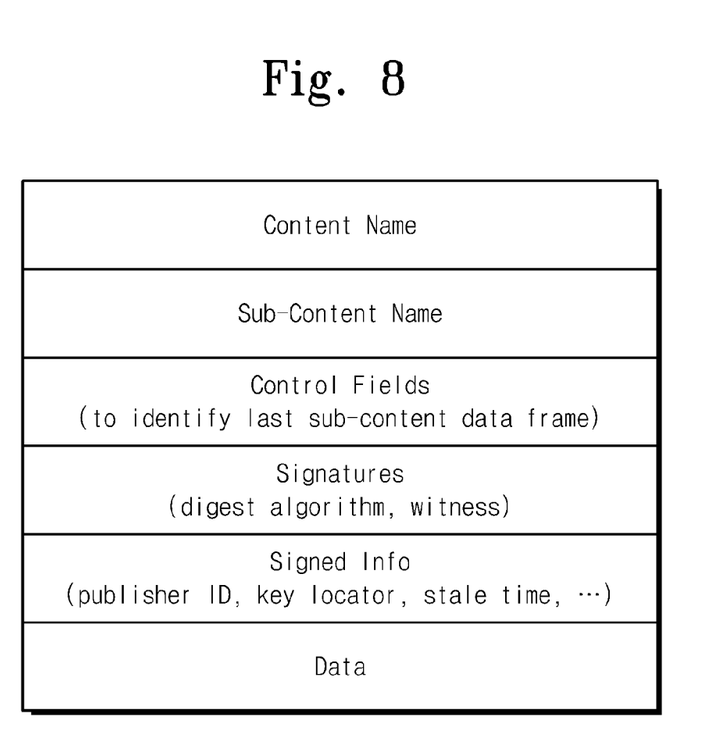
FIG. 8 is a view illustrating a data packet according to an embodiment of the present invention.

FIG. 8 is a view illustrating a data packet according to an embodiment of the present invention. Referring to FIG. 8, the data packet further includes a sub-content name field and a control field unlike the data packet of FIG. 3. Here, the sub-content name is necessary to represent the transmission of each sub content when a content (the name of FIG. 6) is requested with the content name of a top layer in a layer structure including the content name. One control field is necessary to represent that all sub contents are transmitted.

Also, a sub-content name may have various formats. As the above example of a content request, when "/etri.re.kr/nsko/media/aaa/mov/_v0/" is used to request the entire segments of the aaa.mov file, a data packet uses "/etri.re.kr/nsko/media/aaa/mov/_v0/" as a content name by each segment, and uses the segments numbers _s0 and s1 as sub-content names.

Additionally, as an example of the format that request all files below one layer, when several segments are simultaneously requested (for example, one directory name such as "/etri.re.kr/nsko/html/page1/" is used as a content name for request or an additional segment range field such as "StartSegment=Inf, EndSegment=Inf" is used for request), "/etri.re.kr/nsko/html/page1/" is used as a content name and names such as "abc.gif/_v0" and "def.swf/_v0" are used as sub content names.

The present invention provides content caching of aggregate packets and separates the content caching from information management on the position where the content caching is made, so that a large amount of contents may be efficiently managed.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A packet forwarding device for supporting network based content caching of aggregate contents, the packet forwarding device, comprising: a memory, a processor, wherein the processor is coupled to the memory configured to perform a plurality of functions including:
   a forwarding table comprising forwarding information on a content in order to forward a request packet from a terminal;
   a request list table transmitting the request packet to a destination node according to the forwarding table when the request packet arrives;
   a content caching information table comprising the forwarding table, the request list table, and physical position information on where a content cached based on a content ID or a content name is stored; and
   a content server function block storing the cached content,
   wherein, when no entry in the content caching information table for the request packet is found, a new entry is generated in the content caching information table for the request packet,
   wherein a content caching in progress field is stored in the content caching information table to notify that content caching on a content is in progress when the request packet is a data packet having a sub content name and a control field,
   wherein the sub content name represents a transmission requested with a content name of a top layer in a layer structure including the content name and the control field represents that all sub contents are transmitted,
   wherein the request packet includes a content range for a segment or a file in order to simultaneously request several segments on one content file including a plurality of segments.

2. The packet forwarding device of claim 1, wherein the request list table manages information on a requested input and output faces, and is used as path information through which the requested content is transmitted from the destination node to a content requesting node that generates the request packet after the request packet arrives at the destination node having the content.

3. The packet forwarding device of claim 2, wherein the request list table retransmits the request packet when the content does not arrive at the destination node within a predetermined time.

4. The packet forwarding device of claim 3, wherein the request list table deletes a list corresponding to the request packet when the content does not arrive for a predetermined time after the request packet is retransmitted.

5. The packet forwarding device of claim 1, wherein the content caching table comprises the content ID or the content name as a search key value, and comprises the content caching in the progress field notifying that the content caching on a content corresponding to the search key value is in progress.

6. The packet forwarding device of claim 1, wherein the content server function block is provided as another line card in the same system.

7. The packet forwarding device of claim 1, wherein the content server function block is connected to an external system through a face corresponding to the content caching information table.

8. A packet forwarding method for supporting network based content caching of aggregate contents, the method comprising:
   searching for an entry corresponding to a requested packet in a content caching information table;
   storing the packet in a content server function block when the entry is in the content caching information table;
   performing a caching function on a content corresponding to the packet in the content server function block; and
   when the entry is not in the content caching information table and the packet is a request packet, generating an entry for the packet in the content caching information table and searching a request list table by setting a content ID or a content name as a search key,
   setting the content caching in a progress field in the generated entry when the requested packet is a data packet having a sub content name and a control field,
   wherein the sub content name represents a transmission requested with a content name of a top layer in a layer structure including the content name and the control field represents that all sub contents are transmitted
   wherein the content caching information table comprises physical position information on the cached content,
   wherein a content caching in the progress field is stored in the content caching information table to notify that content caching on a content is in progress,
   wherein the requested packet includes a content range for a segment or a file in order to simultaneously request several segments on one content file including a plurality of segments.

9. The method of claim 8, further comprising, when there is a list corresponding to the search key in the request list table, deleting the request packet.

10. The method of claim 8, further comprising, when there is no list corresponding to the search key in the request list table, generating a list corresponding to the request packet, adding input face information, and searching a forwarding table to forward the request packet.

11. The method of claim 10, further comprising, when no content name corresponding to the request packet is searched in the forwarding table, deleting the request packet.

12. The method of claim 11, further comprising retransmitting the request packet by the request list table when a content corresponding to the request packet does not arrive for a predetermined time.

13. The method of claim 12, further comprising deleting an entry for the request packet by the request list table when the content does not arrive for a predetermined time after the retransmission.

14. A packet forwarding method for supporting network based content caching of aggregate contents, the method comprising:
- searching for an entry corresponding to a requested packet in a content caching information table;
- storing the packet in a content server function block when the entry is in the content caching information table;
- performing a caching function on a content corresponding to the packet in the content server function block;
- when there is no entry and the packet is a content transmission packet, generating an entry for the packet in the content caching information table; and
- setting a content caching in a progress field in the generated entry when the content transmission packet is a data packet having a sub content name and a control field,
- wherein the sub content name represents a transmission requested with a content name of a top layer in a layer structure including the content name and the control field represents that all sub contents are transmitted,
- wherein the content caching information table comprises physical position information on the cached content,
- wherein the content caching in the progress field is stored in the content caching information table to notify that content caching on a content is in progress,
- wherein the requested packet includes a content range for a segment or a file in order to simultaneously request several segments on one content file including a plurality of segments.

15. The method of claim 14, further comprising initializing the content caching in the progress field when the sub content arrives.

16. The method of claim 14, further comprising transmitting the content transmission packet to the content server function block.

17. The method of claim 16, further comprising:
- searching for the corresponding entry from the request list table after the content transmission packet is transmitted to the content server function block; and
- transmitting the data packet to a face where the request packet arrives, the face being registered in the searched entry.

18. The method of claim 17, further comprising deleting the request packet when there is no corresponding searched entry in the request list table.

* * * * *